United States Patent Office 3,733,215
Patented May 15, 1973

3,733,215
SURFACE TREATMENT OF POLYESTER MATERIAL
August Jean Van Paesschen, Antwerp, and Lucien Janbaptist Van Gossum, Kontich, Belgium, assignors to Agfa-Gevaert N.V., Mortsel, Belgium
No Drawing. Filed June 8, 1971, Ser. No. 151,131
Claims priority, application Great Britain, June 9, 1970, 27,979/70
Int. Cl. B32b 37/14; B44d 5/04
U.S. Cl. 117—138.8 F         4 Claims

ABSTRACT OF THE DISCLOSURE

To improve the adhesion to polyester surfaces of layers which are subsequently to be applied thereto, there is previously applied to the polyester surface a uniform layer of finely divided silca from an aqueous dispersion of silica particles containing chloral hydrate.

---

This invention relates to the surface treatment of polyester materials and more particularly to the treatment of the surface of these materials so that a subsequently applied coating will adhere firmly to said surface.

It is known from United Kingdom patent specification 1,061,784 filed Aug. 22, 1962 by Ozalid Co. Ltd. and Landau R. that a coating will firmly adhere to the surface of polyester material by first applying to the poleyster surface a uniform layer of finely divided silca particles from a dispersion containing a wetting agent and one or more chlorinated organic acids from the group consisting of dichloroacetic, trichloroacetic and trichloropropionic acid.

It is further known that the halogen-acetic acids are very corrosive towards metal machine parts and conductpipes with which they come into contact and that physiologically they are very irritating to the skin and to mucous membranes.

We have now found that by treating the surface of the polyester material in accordance with the present invention the above mentioned disadvantages do not occur and also that a subsequently applied coating will firmly adhere to the surface of the polyester material.

According to the present invention there is provided a method of treating the surface of a polyester material to facilitate adhesion thereto of a subsequently applied coating, which method consists in the application to it of a uniform layer of particles of finely divided silica, from an aqueous dispersion of silica particles containing chloral hydrate.

Preferably the aqueous dispersion comprises between 0.25 and 5% by weight of silica particles and 5 to 30% by weight of chloral hydrate and is applied to the polyester surface in such a way that between 60 and 1250 mg. of silica and between 1250 and 7500 mg. of chloral hydrate are present per sq. m. of polyester surface. It is further preferred that the particle size of the silica is comprised between 10 and 120 nm. (nanometer).

The surface to be treated may be the surface of a sheet or film of polyester or may be the surface of yarns or threads made of polyester. The invention has particular application to the treatment of surfaces of a film-forming linear polycondensation-type polyester. These polyesters may be prepared by a transesterification of a dialkyl ester of a dicarboxylic acid, preferably a dialkyl ester of terephthalic acid, with a glycol preferably ethylene glycol, and by polycondensation of the glycol dicarboxylate formed to give a high-molecular weight film-forming polyester. The above transesterification step may also be placed by a direct esterification of the dicarboxylic acid with the glycol, or by conversion of the dicarboxylic acid with an alkylene oxide, e.g. ethylene oxide, whereby also the glycol dicarboxylate is formed.

The example given hereinafter especially refer to the treatment of surfaces of polyethylene terephthalate film. The invention is not restricted, however, to the use of film derived from the reaction of terephthalic acid and ethylene glycol. In the preparation of the high-molecular weight polyester, other glycols may partially or wholly replace ethylene glycol, e.g. neopentyl glycol and 1,4-di(hydroxymethyl)-cyclohexane. The terephthalic acid also can be replaced partially or wholly by other dibasic acids such as, e.g., isophthalic acid, sebacic acid, and adipic acid.

By treating the surface of polyester materials in accordance with the present invention and after drying, a layer is formed that firmly adheres to the polyester surface and provides the material with a surface to which subsequently applied coatings will also firmly adhere. In this way this adhesive layer may be used to firmly adhere different photographic layers to polyethylene terephthalate film supports, for instance gelatino silver halide emulsion layers, antihalation layers and antistatic layers. In magnetic recording materials the silica-containing adhesive layer firmly binds layers containing magnetic material to the poleyster film support. Also in electrophotographic materials the adhesive layer of the invention is responsible for the firm bond of further layers to the polyester film support, which further layers do not show any tendency to peel off neither in the wet nor in the dry state. This is the same with layers as used in drawing materials.

According to the invention polyester surfaces are treated with a coating composition comprising chloral hydrate and a colloidal dispersion of silica. Both materials are necessarily to be used together. If one of them is omitted, or if the given ratios are exceeded, the desired physical properties are impaired such as the adhesion of other layers, the tackiness of the layer, the transparency. However, still other materials can be added to the coating composition comprising chloral hydrate and colloidal silica, e.g. materials whereby the transparency, the strength or the antistatic properties of the layer can be influenced favourably.

The following is a description of examples carrying the invention into effect.

EXAMPLE 1

A biaxially oriented polyethylene terephthalate film having a thickness of 100μ was coated on both sides with a layer from the following coating composition at a ratio of 45 sq. m./litre:

| | |
|---|---|
| Chloral hydrate | g 120 |
| Water | ml 267 |
| 30% aqueous dispersion of colloidal silica having a particle size of 30 nm. (pH 4) | ml 13 |
| 20% by weight latex of copoly(vinyl chloride/vinylidene chlorine/n-butyl acrylate/itaconic acid) (50:30:182% by weight) | ml 20 |
| Isopropanol | ml 650 |
| Ethylene glycol monomethyl ether | ml 50 |

After drying both layers were covered with a second layer at a ratio of 60 sq. m./litre from the following coating composition:

| | Ml. |
|---|---|
| Water | 377 |
| 30% aqueous dispersion of colloidal silica having a particle size of 30 nm. (pH 7) | 91 |
| 10% aqueous solution of disodium salt of heptadecylbenzimidazole-disulphonic acid | 2 |
| Methanol | 500 |
| 10% aqueous solution of chromium acetate | 30 |

To one side of the coated support was applied a light-sensitive gelatino-silver halide emulsion layer as used in the graphic art, whereas to the other side a known antihalation layer of gelatin and managanese(IV) oxide was coated.

The adhesion of the combination of layers to the polyester support was very good in dry as well as in wet state.

EXAMPLE 2

A biaxially oriented polyethylene terephthalate film of 180µ thickness was coated on both sides with the first coating composition of Example 1, but at a ratio of 30 sq. m./litre.

After drying both layers were covered with a second layer at a ratio of 45 sq. m./litre from the following coating composition:

| | | |
|---|---|---|
| Gelatin | g | 10 |
| 25% by weight solution of salicyclic acid in methanol | ml | 5 |
| Water | ml | 200 |
| Methanol | ml | 200 |
| Butanone | ml | 500 |
| Dioxane | ml | 100 |
| 20% aqueous solution of formaldehyde | ml | 0.5 |

After drying one side was covered with a light-sensitive gelatino-silver halide emulsion layer as used in the graphic art and the other side with an antihalation layer of gelatin and manganese(IV) oxide.

The different layers adhered very well in dry as well as in wet state.

EXAMPLE 3

A blue tinted biaxially oriented polyethylene terephthalate film having a thickness of 180µ was coated on both sides at a ratio of 40 sq. m./litre with the first coating composition of Example 1. To the coated polyester support a layer was applied on both sides at a ratio of 45 sq. m./litre from the following coating composition:

| | | |
|---|---|---|
| Water | ml | 778 |
| Gelatin | g | 5 |
| 30% aqueous dispersion of colloidal silica having a particle size of 30 nm. (pH 9.5) | ml | 67 |
| 10% aqueous solution of sodium salt of sulphosalicylic acid | ml | 50 |
| 10% aqueous solution of disodium salt of heptadecyl-benzimidazole-disulphonic acid | ml | 2.5 |
| Methanol | ml | 100 |
| 1,3-glycidyl-2-hydroxypropane | ml | 2.5 |

To both sides of the coated polyester film were applied light-sensitive gelatino-silver halide emulsion layers as commonly used in X-ray photography. Adhesion of the layers was excellent in dry as well as in wet state.

EXAMPLE 4

A biaxially oriented polyethylene terephthalate film having a thickness of 63µ was coated on one side at a ratio of 45 sq. m./litre with the following coating composition:

| | | |
|---|---|---|
| Chloral hydrate | g | 100 |
| Resorcinol | g | 30 |
| 30% aqueous dispersion of colloidal silica having a particle size of 15 nm. (pH 9.5) | ml | 33 |
| Water | ml | 562 |
| Methanol | ml | 400 |
| 10% aqueous solution of disodium salt of heptadecyl-benzimidazole-disulphonic acid | ml | 5 |

To the dried coating a second layer was applied at a ratio of 55 sq. m./litre from the following coating composition:

| | | |
|---|---|---|
| Water | ml | 10 |
| Gelatin | g | 10 |
| Ethylene chlorohydrine | ml | 13 |
| 25% solution of salicyclic acid in methanol | ml | 15 |
| Methanol | ml | 762 |
| Butanol | ml | 150 |
| Ethylene glycol monomethyl ether | ml | 50 |
| Nitrocellulose | g | 7 |

After drying, a light-sensitive gelatin silver halide emulsion layer was applied to the latter layer, said emulsion being manufactured as follows:

A solution of 100 g. of silver nitrate in 1 litre of water was added at 47° C. in a period of time of 30 sec. to a solution of 70 g. of potassium bromide, 1 g. of potassium iodide and 25 g. of gelatin in 500 ml. of water.

10 min. later 70 g. of gelatin were added, and after 30 min. the emulsion was solidified. Thereupon the emulsion was shredded, rinsed for 5 min., admixed with 40 g. of ripening gelatin, and maintained at 50° C. for 4 min. The fine-grained emulsion thus obtained was coated so that each sq. m. carried an amount of silver halide equivalent to 4 g. of silver.

The rear side of the polyethylene terephthalate film support was provided with a known antihalation layer.

Before, during as well as after treatment in the photographic baths a good adhesion was obtained between the polyethylene terephthalate film support and the silver halide emulsion layer.

EXAMPLE 5

Both sides of a biaxially oriented polyethylene terephthalate film having a thickness of 100µ were covered at 45 sq. m./litre with the first coating composition of Example 1 with the sole difference that the size of the silica particles was about 120 nm.

To this layer was applied a matting layer from the following composition:

| | | |
|---|---|---|
| Crystalline silicon dioxide (average particle size: 10µ) | g | 250 |
| Melamine-formol | g | 100 |
| Phenyltrichlorosilane | ml | 5 |
| Hydroxypropylcellulose | g | 1 |
| Polyethylene oxide (mol. wt. 20,000) | g | 20 |
| Ammonium salt of perfluorocaprylic acid | g | 25 |
| Water | ml | 40 |
| Ethylene glycol monomethyl ether | ml | 180 |
| Acetone | ml | 430 |

A very good drafting film for pencil was well as for ink was obtained.

EXAMPLE 6

Both sides of a biaxially oriented polyethylene terephthalate film were coated at a ratio of 40 sq. m./litre with the following coating composition:

| | | |
|---|---|---|
| Chloral hydrate | g | 100 |
| Water | ml | 287 |
| 30% aqueous dispersion of colloidal silica having a particle size of 30 nm. (pH 7) | ml | 13 |
| Isopropanol | ml | 650 |
| Ethylene glycol monomethyl ether | ml | 50 |

These primer layers were covered with a coating composition in such a way that after drying a layer of 4–5µ remained. The coating composition was prepared as follows: 2025 g. of titanium dioxide were dispersed in 7500 ml. of water with 37 ml. of sodium hexametaphosphate as dispersing agent. The dispersion was stirred fastly for 10 min. at 5–15° C. and then heated to 35° C. A 10% by weight of aqueous solution of gelatin was added thereto with rapid stirring. The following composition was then added with slow stirring to avoid scumming:

| | Ml. |
|---|---|
| 10% aqueous solution of gelatin | 2600 |
| Water | 300 |
| 20% by weight latex of the copoly(butadiene/methyl methacrylate) (50:50 mole percent) | 3750 |
| 10% by weight aqueous solution of sodium salt of oleylmethyltauride | 225 |
| Ethylene chlorohydrin | 750 |

The white opaque film obtained can be used as a receptor surface in the production of "colour proofs" such as used by a colour etcher when correcting a set of colour prints prior to using them for the production of colour plates and also for the reproduction of the colour quality that will be obtained during the printing process. The adhesion of the different layers to the polyester film support was excellent.

EXAMPLE 7

To a subbing layer such as described in Example 1 a magnetic sound track of about 12μ thickness is applied from the following coating composition:

| | Parts |
|---|---|
| γ-iron(II) oxide | 75 |
| Copoly(vinyl chloride/vinyl acetate/vinyl alcohol) (91:3:6 percent by weight) | 20 |
| GAFAC RM 710 | 1 |
| Oleic acid | 4 |
| Butyl acetate | 60 |
| Ethyl acetate | 40 | all parts being parts by weight.

GAFAC RM 710 is the trade name of General Aniline and Film Corporation for a mixture of organic phosphates of the formulae:

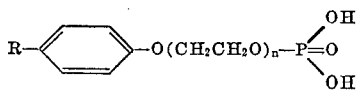

and

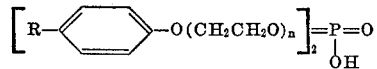

wherein R is an alkyl group.

A good adhesion was obtained, also after processing in photographic baths.

What we claim is:

1. A method of treating the surface of a polyester material to facilitate adhesion thereto of a subsequently applied coating, which method consists in the application to said polyester material of a uniform layer of particles of finely divided silica, from an aqueous dispersion of silica particles containing chloral hydrate, said dispersion comprising between about 0.25–5% by weight of silica particles and about 5–30% by weight of chloral hydrate.

2. A method according to claim 1, in which the polyester material is a sheet or film.

3. A method according to claim 1, in which the polyester material is polyethylene terephthalate.

4. A method according to claim 1, wherein the size of the silica particles is comprised between 10 and 120 nm.

References Cited

UNITED STATES PATENTS

| 3,396,046 | 8/1968 | Landau | 117—138.8 |
| 3,524,762 | 8/1970 | Bradt et al. | 117—138.8 |

WILLIAM D. MARTIN, Primary Examiner

S. L. CHILDS, Assistant Examiner

U.S. Cl. X.R.

96—87 R; 117—34, 68, 83, 239